US006311112B1

(12) United States Patent
Mazur et al.

(10) Patent No.: US 6,311,112 B1
(45) Date of Patent: Oct. 30, 2001

(54) OCCUPANT RESTRAINT SYSTEM AND METHOD HAVING SMART PROCESS INITIATION CONTROL

(75) Inventors: Joseph F. Mazur, Washington; Brian K. Blackburn, Rochester Hills; Scott B. Gentry, Romeo, all of MI (US)

(73) Assignees: TRW Inc.; TRW Vehicle Safety Systems Inc., both of Lyndhurst, OH (US)

(*) Notice: Subject to any disclaimer, the term of this patent is extended or adjusted under 35 U.S.C. 154(b) by 0 days.

(21) Appl. No.: 08/994,202

(22) Filed: Dec. 19, 1997

(51) Int. Cl.[7] ................................. B60R 21/32
(52) U.S. Cl. ..................... 701/45; 280/735; 180/282
(58) Field of Search ..................... 701/45, 46, 47, 701/49; 318/286, 466, 467, 468; 280/728.1, 734, 735; 180/271, 273, 268, 282; 307/10.1

(56) References Cited

U.S. PATENT DOCUMENTS

| 5,081,587 |   | 1/1992  | Okano ............................. 280/735 |
| 5,225,985 |   | 7/1993  | Okano ............................. 280/735 |
| 5,232,243 |   | 8/1993  | Blackburn et al. ............. 280/735 |
| 5,330,226 |   | 7/1994  | Gentry et al. .................. 280/735 |
| 5,389,824 |   | 2/1995  | Moroto et al. ................. 280/735 |
| 5,398,185 |   | 3/1995  | Omura ............................ 280/735 |
| 5,413,378 |   | 5/1995  | Steffens, Jr. ................... 280/735 |
| 5,521,822 |   | 5/1996  | Wang ............................. 280/735 |
| 5,559,697 |   | 9/1996  | Wang ............................. 280/735 |
| 5,573,269 | * | 11/1996 | Gentry et al. .................. 280/734 |
| 5,605,202 |   | 2/1997  | Dixon ............................ 280/735 |
| 5,670,853 | * | 9/1997  | Bauer ............................ 180/273 |
| 5,694,320 | * | 12/1997 | Breed ............................. 701/45 |
| 5,702,123 | * | 12/1997 | Takahashi et al. ............. 280/735 |
| 5,748,473 | * | 5/1998  | Breed et al. ................... 180/273 |
| 5,785,347 | * | 7/1998  | Adolph et al. ................. 280/735 |
| 5,822,707 | * | 10/1998 | Breed et al. ................... 701/49 |

* cited by examiner

Primary Examiner—Gary Chin
(74) Attorney, Agent, or Firm—Tarolli, Sundheim, Covell, Tummino & Szabo L.L.P.

(57) ABSTRACT

A vehicle occupant restraint system (10) has an actuatable occupant restraint device (16) with an aspect adjustable for adjusting actuation of the restraint device. An associated control method controls the system (10). Within the system (10), a sensor (40) senses a vehicle operating parameter functionally related to crash acceleration and provides a signal (42) indicative thereof. A threshold determination function (44) of a microcomputer (18) determines whether the signal (42) from the sensor (40) exceeds a threshold value. An occupant characteristic sensor (26) senses an occupant characteristic in response to a determination that the signal (42) from the sensor (40) exceeds the threshold value and provides a signal (28A) indicative thereof. A restraint adjustment controller function (38) of the microcomputer (18) determines adjustment of the adjustable aspect of the restraint device (16) in response to the determination that the signal (42) from the sensor (40) exceeds the threshold value and in response to the signal (28A) from the occupant characteristic sensor (26). The adjustment controller function (38) provides a signal (20A) indicative of the determined adjustment to cause adjustment of the restraint device (16).

27 Claims, 3 Drawing Sheets

OCCUPANT RESTRAINT SYSTEM AND METHOD HAVING SMART PROCESS INITIATION CONTROL

TECHNICAL FIELD

The present invention is directed to a smart-type vehicle occupant restraint system and is particularly directed to a system and a method in which initiation of a smart process of a restraint device is controlled.

BACKGROUND OF THE INVENTION

Vehicle occupant restraint systems that have an actuatable restraint device are known in the art. The actuatable restraint device of such a system is actuated upon the occurrence of a condition for which a vehicle occupant is to be restrained. An example of a condition for which a vehicle occupant is to be restrained is a vehicle collision.

One type of actuatable restraint system includes an air bag module mounted within a vehicle such that an air bag of the module is inflatable within an occupant compartment of the vehicle. The air bag is inflated upon the occurrence of a condition, such as a vehicle collision. Another type of actuatable restraint system has a seat belt extendable across a vehicle occupant and includes an actuatable device, such as a pretensioner, to move at least a portion of the seat belt relative to the occupant. The pretensioner is actuated upon the occurrence of a condition, e.g., a vehicle collision. The pretensioner removes slack from the seat belt to limit occupant movement.

An actuatable occupant restraint system includes one or more sensors for sensing one or more parameters that are indicative of a condition for which the vehicle occupant is to be restrained. For example, one sensor is a collision sensor, which provides a signal that indicates that the vehicle is in a collision condition. The one or more sensors provide signals to a controller. The controller evaluates the signal(s) and determines whether to actuate the associated occupant restraint.

One type of actuatable restraint system is known as a "smart" type of restraint system. A smart restraint system has one or more adjustable aspects that are adjusted to change the actuation (i.e., deployment) of the restraint device. For example, in a smart restraint system that includes an air bag, the deployment profile of the air bag is adjustable. The adjustable aspects regarding the deployment profile of the air bag may include adjustment of a timing sequence for inflation, adjustment of pressure within the air bag during inflation and upon completion of inflation, and adjustment of air bag position with respect to the occupant.

To make determinations regarding adjustment within a smart restraint system, one or more characteristics of the occupant is/are sensed. For example, one or more sensors of the smart restraint system sense one or more of the following characteristics: size of the occupant, weight of the occupant, and distance between the occupant and a vehicle component surface.

SUMMARY OF THE INVENTION

A vehicle occupant restraint system, in accordance with one aspect of the present invention, includes an actuatable vehicle occupant restraint device, which is adjustable in response to an adjustment signal. Parameter sensing means senses a vehicle operating parameter functionally related to vehicle crash acceleration and provides a parameter signal indicative thereof. Determination means determines whether the parameter signal exceeds a threshold value. Characteristics sensing means senses an occupant characteristic and provides an occupant characteristic signal indicative thereof. Control means determines needed adjustment of the adjustable aspect of the restraint device in response to the determination that the parameter signal exceeds the threshold value and in response to the occupant characteristic signal. The control means provides the adjustment signal indicative of the determined needed adjustment to adjust the restraint device.

In accordance with another aspect of the present invention, a vehicle occupant restraint system includes characteristic sensing means for sensing an occupant characteristic in response to a determination that a sensed parameter signal exceeds a threshold value and for providing an occupant characteristic signal indicative thereof. The system further includes control means for determining needed adjustment of the adjustable aspect of the restraint device in response to the occupant characteristic signal.

In addition, in accordance with the present invention, a method is provided for controlling an actuatable vehicle occupant restraint device having an aspect that is adjustable for adjusting actuation of the restraint device. A vehicle operating parameter functionally related to vehicle crash acceleration is sensed. A parameter signal indicative of the sensed vehicle operating parameter is provided. A determination is made whether the parameter signal exceeds a threshold value. An occupant characteristic is sensed and an occupant characteristic signal is provided which is indicative of the sensed occupant characteristic. A needed adjustment of the adjustable aspect of the restraint device is determined in response to a determination that the parameter signal exceeds the threshold value and in response to the occupant characteristic signal. The adjustable aspect of the restraint device is adjusted in response to the determined needed adjustment.

In accordance with another aspect of the present invention, a method is provided for controlling an actuatable restraint. The method includes sensing an occupant characteristic in response to a determination that a sensed parameter signal exceeds a threshold value, providing an occupant characteristic signal indicative of the sensed occupant characteristic, and determining adjustment of an adjustable aspect of the restraint device in response to the occupant characteristic signal.

BRIEF DESCRIPTION OF THE DRAWINGS

Further features and advantages of the present invention will become apparent to those skilled in the art to which the present invention relates from reading the following description with reference to the accompanying drawings, in which.

DESCRIPTION OF PREFERRED EMBODIMENTS

Figure 1:
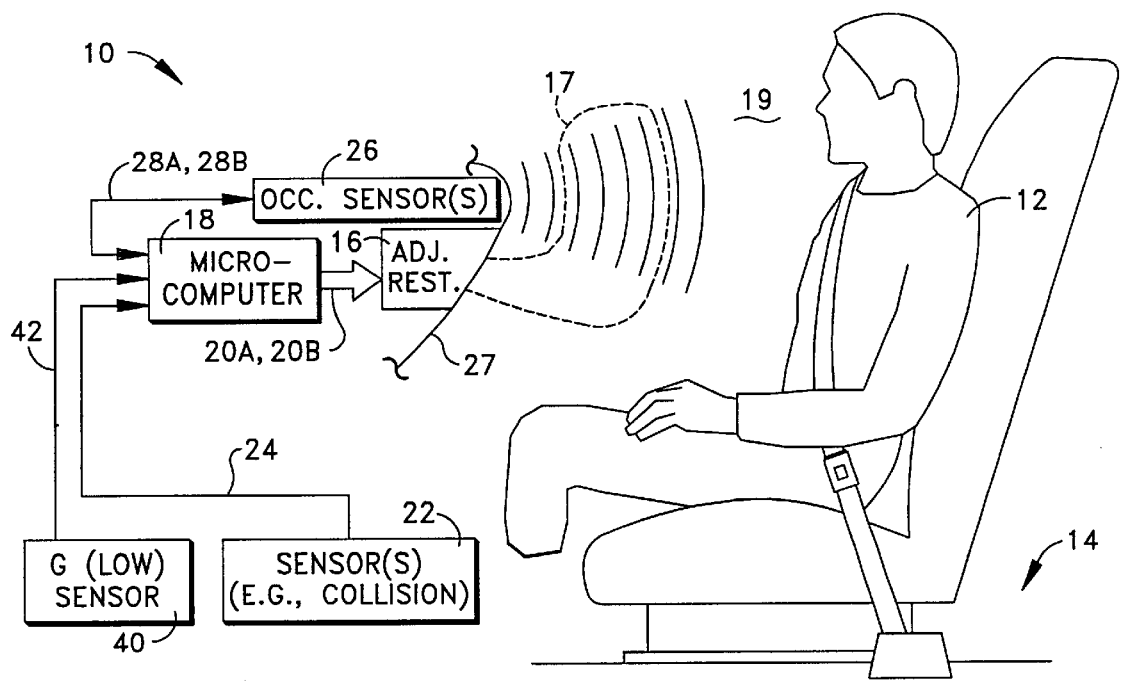
FIG. 1 is a schematic illustration of a vehicle having an occupant restraint system in accordance with the present invention.

FIG. 1 is a schematic illustration of an occupant restraint system 10 for an occupant 12 within a vehicle 14. The system 10 includes an actuatable occupant restraint device 16. In the illustrated example, the actuatable restraint device 16 is an inflatable restraint module that has an inflatable restraint member (e.g., air bag 17). Upon actuation of the inflatable restraint module, the air bag 17 is inflated within an occupant compartment 19 of the vehicle 14.

It is to be appreciated by a person of ordinary skill in the art that a plurality of actuatable restraint devices and/or different actuatable restraint device can be used within a restraint system according to the present invention. An actuatable knee bolster device and a seat belt restraint with an actuatable portion (e.g., pretensioner) are examples of different actuatable restraint devices that may be used. The actuatable restraint device 16 of the illustrated example is hereinafter referred to as the restraint module 16.

The restraint module 16 has at least one adjustable aspect that is adjustable to adjust actuation of the restraint module. Examples of such adjustable aspects of the restraint module 16 include adjustable inflation timing, adjustable inflation pressure, and adjustable air bag position. A specific example of adjustment to inflation timing is selection of a period between a determination to actuate the restraint module and the actual initiation of air bag inflation. A specific example of adjustment of inflation pressure is control of a pressure relief valve, which controllably vents fluid during inflation of the air bag. A specific example of adjustment of air bag positioning is selection of a location relative to a torso of the occupant 12 for placement of the inflated air bag. The positioning can be accomplished by directing inflation fluid into the air bag in predetermined zones within the air bag or by pointing the entire restraint module via moving devices such as positioning motors. Another specific example of adjustment of air bag positioning is moving the entire restraint module toward or away from the occupant using positioning motors and/or moving the occupant toward or away from the restraint module using seat motors.

Adjustment and actuation of the restraint module 16 is controlled by a microcomputer 18, which provides signals 20 to the restraint module 16. The signals 20 include an adjustment signal 20A and an actuation signal 20B. The microcomputer 18 makes determinations regarding adjustment and actuation of the restraint module 16 based upon several sensor inputs provided to the microcomputer 18.

Specifically, one or more sensors 22 are provided for sensing a condition for which the occupant 12 is to be restrained. For example, the condition for which the occupant 12 is to be restrained is a sensed condition, which is indicative of the occurrence of a collision of the vehicle 14. The sensors 22 may include a sensor for detecting an impact of the vehicle 14, a sensor for detecting rollover of the vehicle and/or a sensor for detecting vehicle crash acceleration. A person of ordinary skill in the art will appreciate that crash acceleration (vehicle reference frame) is the same as vehicle deceleration (earth reference frame). The sensors 22 provide one or more signals 24 to the microcomputer 18. Hereinafter, only one sensor 22 (e.g., an accelerometer) and its signal 24 (e.g., a crash acceleration signal having an electrical characteristic indicative of acceleration) are discussed.

Further control and adjustment of the restraint module 16 by the microcomputer 18 is based upon one or more sensed occupant characteristics. A person of ordinary skill in the art will now appreciate that, because the restraint module 16 has adjustable aspects which are adjustable based upon sensed occupant characteristics, the restraint module 16 is a type of restraint device commonly referred to in the art as a "smart" restraint device. One or more occupant sensors 26 are provided in the system 10 to sense occupant characteristic(s).

Examples of sensed occupant characteristic(s) include presence of the occupant, size of the occupant, weight of the occupant, whether the occupant is secured by a seat belt, and the location of the occupant (e.g., an out of position occupant). The location of the occupant characteristic sensors 26 would be dependent upon the occupant condition sensed. For example, a seat belt buckle sensor would be in the seat belt buckle assembly. Occupant position sensors would be in the instrument panel, overhead, or seat back. Occupant weight sensor would be in the seat bottom. For ease of discussion and understanding, only a single occupant characteristic sensor 26 is discussed.

In the illustrated example, the occupant characteristic sensor 26 is preferably a position sensor 26 including an ultrasound sensor mounted in the instrument panel 27 of the vehicle 14. The ultrasound sensor transmits an ultrasonic signal toward the vehicle seat upon which the occupant 12 is located. Reflected ultrasonic energy is received by the occupant characteristic sensor 26.

The occupant characteristic sensor 26 and the microcomputer 18 communicate via signals 28. Specifically, the occupant characteristic sensor 26 provides a signal 28A to the microcomputer 18. The signal 28A is indicative of the sensed occupant characteristic. The microcomputer 18 provides a signal 28B to the occupant characteristic sensor 26 for controlling operation of the sensor 26. Control of the occupant characteristic sensor 26 includes enabling and disabling the occupant sensor, e.g., turning the sensor ON and OFF. In the illustrated example, the ultrasonic signal is not transmitted when the occupant characteristic sensor 26 is disabled or OFF.

Figure 2:
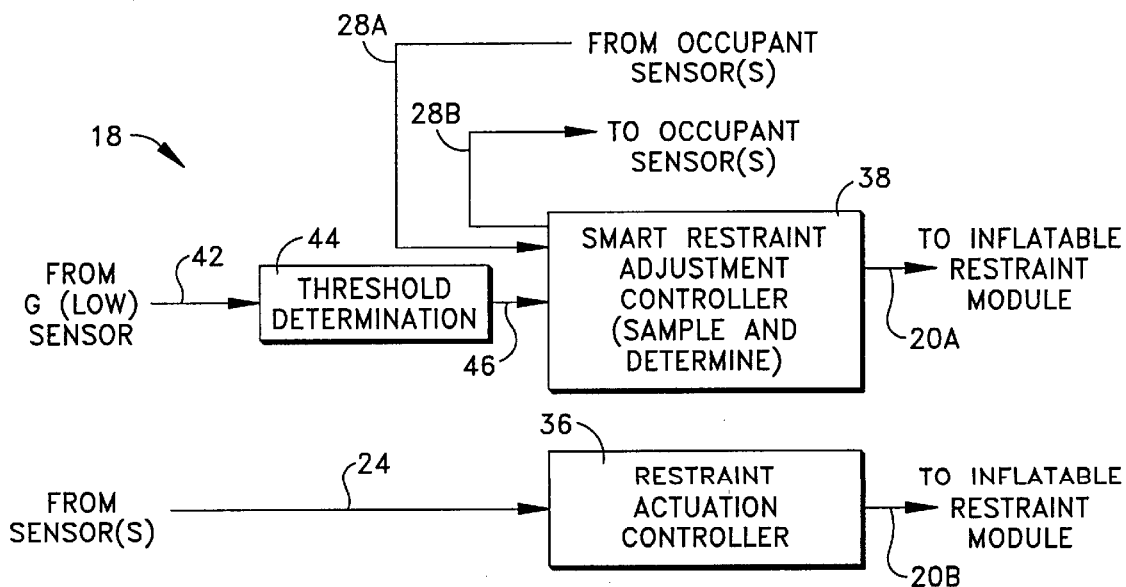
FIG. 2 is a schematic illustration of a portion of a microcomputer of the restraint system shown in FIG. 1.

Within the microcomputer 18 (FIG. 2), a restraint actuation controller function 36 is provided. The actuation controller function 36 processes information from the signal 24 of the sensor 22 to determine whether to provide the actuation signal 20B to the restraint module 16. In addition, within the microcomputer 18, a smart restraint adjustment controller function 38 is provided. The adjustment controller function 38 controls the occupant characteristic sensor 26 and monitors the occupant characteristic signal 28A from the sensor 26 to thereby gather information regarding the occupant characteristic that is sensed by the sensor 26.

The information regarding the sensed occupant characteristic is processed by the smart restraint adjustment controller function 38 to determine any needed adjustment of the restraint module 16. Once an adjustment is determined, the adjustment signal 20A, which contains instructions for the restraint module 16 corresponding to the determined adjustment, is provided to the restraint module 16 and adjustment of the restraint module is thereby accomplished. The sensing of the occupant characteristic by the occupant characteristic sensor 26, the provision of the occupant characteristic signal 28A, the monitoring of the signal 28A, the determination of any needed adjustment by the adjustment controller function 38, and the adjustment of the restraint module 16 in response to the adjustment signal 20A referred to as the "adjustment process."

Within the system 10 (FIG. 1), a low G sensor 40 is provided as part of a means for controlling initiation of the adjustment process. Specifically, the low G sensor 40 is an acceleration sensor that senses deceleration of the vehicle 14, e.g. as occurs during a collision ("crash acceleration"). The low G sensor 40 provides a signal 42 indicative of sensed crash acceleration to the microcomputer 18.

Within the microcomputer 18 (FIG. 2), a threshold determination function 44 continuously samples the signal 42 from the low G sensor 40, at a predetermined rate, and determines whether the signal 42 has a value which is indicative of vehicle deceleration that exceeds a predetermined threshold value. The predetermined threshold value is relatively low, i.e., below a crash acceleration threshold value that would be needed to trigger the restraint module 16. In the preferred embodiment, the low G threshold value is approximately two G's (i.e., 64 ft/s$^2$ or 19.6 m/s$^2$).

When the threshold determination function 44 determines that the signal 42 from the low G sensor 40 indicates a vehicle deceleration exceeding the predetermined threshold value, a signal 46 indicative thereof is provided to the adjustment controller function 38. The signal 46 indicating that the low G threshold value has been exceeded is indicative of the possibility that a vehicle collision event may be in progress. A condition resulting in the low G threshold value being exceeded is the vehicle driver initiating a hard breaking of the vehicle as occurs when the driver "slams" on the brakes as he attempts to avoid the collision.

The signal 46 indicating an excess low G braking event causes the adjustment controller function 38 to start the adjustment process of the adjustable aspects of the restraint module 16. Specifically, upon receiving the signal 46 indicating the excess low G braking event, the adjustment controller function 38 provides the signal 28B to the occupant characteristic sensor 26. The signal 28B contains an instruction for the occupant characteristic sensor 26 to begin its sensing operation (i.e., transmission and reception of the ultrasonic signals) to "sense" the particular occupant characteristic (e.g., position or distance relative to the restraint 16). Once the occupant characteristic sensor 26 begins sensing, the occupant sensor provides the occupant characteristic signal 28A (i.e., indicative of the occupant characteristic) to the microcomputer 18.

Also, after receipt of the signal 46 from the threshold determination 44 and upon receipt of the occupant characteristic signal 28A from the occupant characteristic sensor 26, the adjustment controller function 38 determines the occupant characteristic. The adjustment controller 38 processes the information (occupant characteristic) contained within the occupant characteristic signal 28A to make one or more determinations regarding adjustment of the adjustable aspect of the restraint module 16, and provides the adjustment signal 20A to the restraint module to effect the needed adjustment.

Prior to the low G sensor 40 providing the signal 42 indicative of vehicle deceleration exceeding the predetermined threshold value, the occupant characteristic sensor 26 is disabled or OFF and the occupant characteristic is not sensed. Also, the occupant characteristic signal 28A is not sampled and adjustment determinations for the restraint module 16 are not made by the adjustment controller function 38. Thus, unnecessary sensing and sampling of what may be spurious information regarding occupant characteristics is not done. In addition, unnecessary information processing, to provide adjustment determinations, and unnecessary adjustments of the restraint module 16 are not done.

Figure 3:
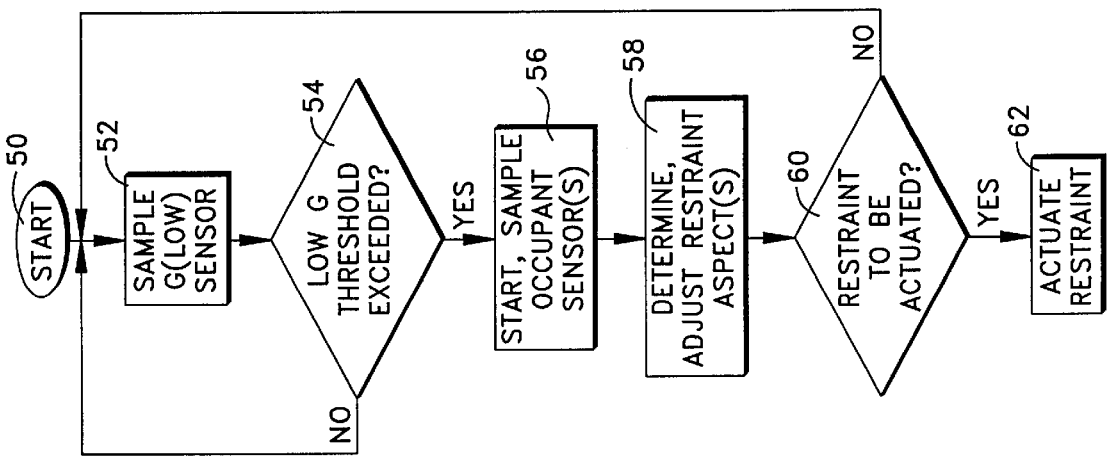
FIG. 3 is a flowchart for a process, in accordance with the present invention, performed within the microcomputer of the restraint system shown in FIG. 1.

FIG. 3 illustrates a process that occurs within the microcomputer 18. The process of FIG. 3 is initiated at step 50 and proceeds to step 52 in which the signal 42 from the low G sensor is sampled. At step 54, it is determined whether the signal 42 is indicative of crash acceleration exceeding the predetermined threshold value. If the determination at step 54 is negative, the process loops back to step 52. If the determination at step 54 is affirmative, the process proceeds to step 56. In step 56, the sensing of the occupant characteristic is initiated and the signal 28A is sampled.

At step 58, determination(s) and adjustment(s) regarding the restraint module 16 occur in response to the output(s) of the occupant sensor(s) sampled in step 56. At step 60, it is determined whether the restraint module 16 is to be actuated (e.g., whether the signal 24 from the sensor 22 is indicative of a deployment collision). If the determination at step 60 is negative, the process loops back to step 52. If the determination at step 60 is affirmative, the process proceeds to step 62 where the restraint module 16 is actuated, e.g., the air bag is deployed.

Figure 4:
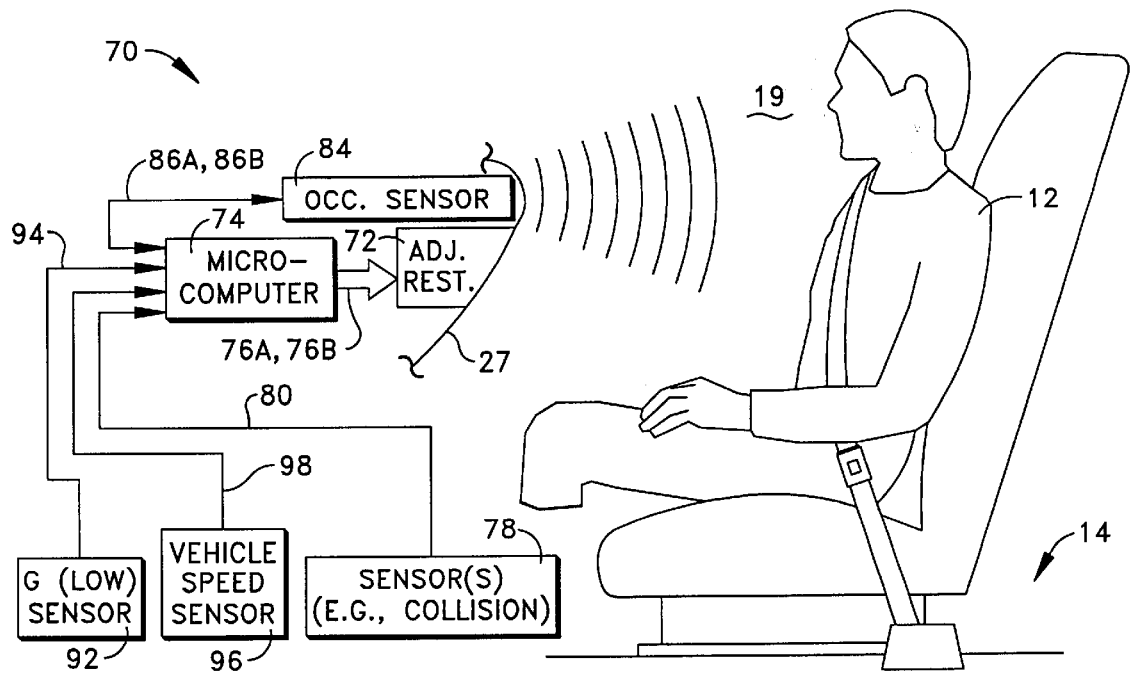
FIG. 4 is a schematic illustration of another embodiment, in accordance with the present invention, of an occupant restraint system within a vehicle.

A second embodiment of the present invention is schematically illustrated in FIG. 4 as an occupant restraint system 70 for the occupant 12 within the vehicle 14. The system 70 includes an actuatable occupant restraint device 72. In the illustrated example of this second embodiment of the present invention, the restraint device 72 is an inflatable restraint module that is identical to the restraint module 16 described with regard to the first embodiment (FIG. 1). The restraint device 72 (FIG. 4) of the second embodiment is hereinafter referred to as the restraint module 72.

Adjustment and actuation of the restraint module 72 is controlled by a microcomputer 74, which provides signals 76 to the restraint module. The signals 76 include an adjustment signal 76A and an actuation signal 76B. The microcomputer 74 makes determinations regarding adjustment and actuation of the restraint module 72 based upon several sensor inputs provided to the microcomputer 74.

Figure 5:
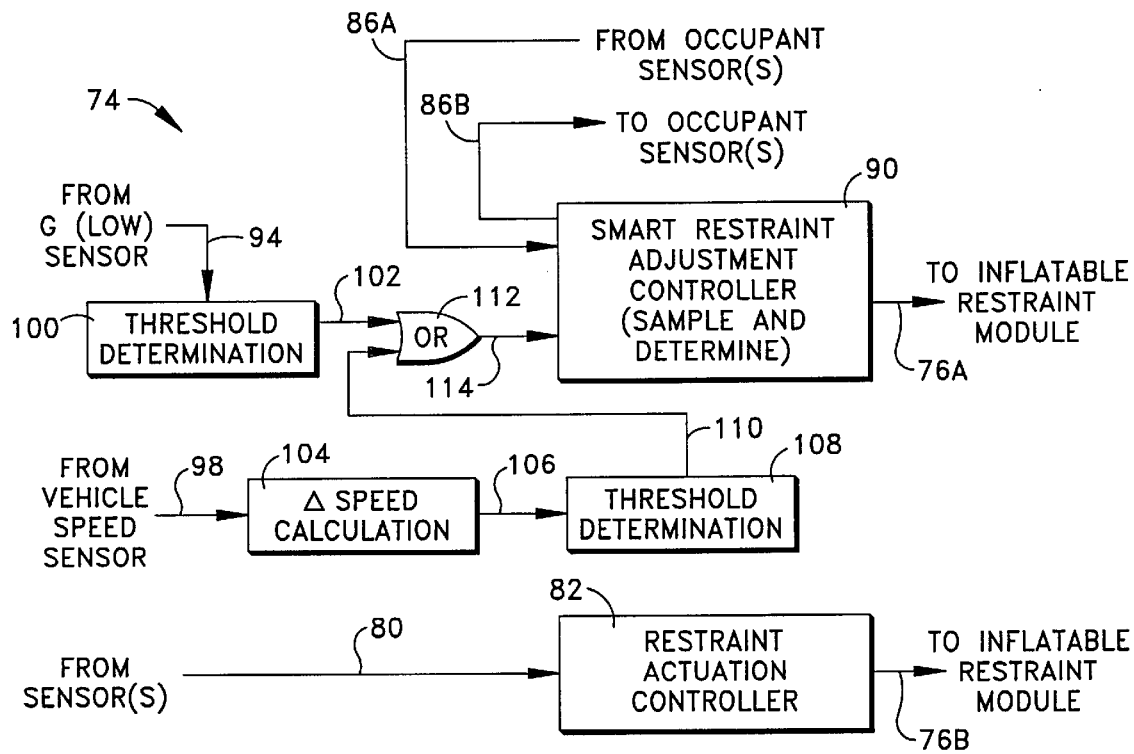
FIG. 5 is a schematic illustration of a portion of a microcomputer of the system shown in FIG. 4.

Specifically, one or more sensors 78 are provided for sensing a condition for which the occupant 12 is to be restrained. In the illustrated example of the second embodiment, the sensors 78 are identical to the sensors 22 (FIG. 1) of the first embodiment. Hereinafter, only one sensor 78 (FIG. 4) and its signal 80 are discussed. Within the microcomputer 74, a restraint actuation controller function 82 (FIG. 5) is provided. The actuation controller function 82 processes information from the signal 80 of the sensor 78 to determine whether to provide the actuation signal 76B to the restraint module 72 (FIG. 4).

Control of adjustment of the restraint module 72 by the microcomputer 74 is based upon one or more sensed occupant characteristics. One or more occupant sensors 84 are provided for sensing occupant characteristic(s). In the illustrated example of the second embodiment, only one occupant sensor 84 is discussed and that occupant sensor 84 is identical to the occupant characteristic sensor 26 (FIG. 1) of the first embodiment. A signal 86A (FIG. 4) which is indicative of the sensed occupant characteristic (e.g., position) is provided to the microcomputer 74 from the occupant sensor 84. A signal 86B for controlling operation of the occupant sensor 84 is provided to the occupant sensor from the microcomputer 74.

A smart restraint adjustment controller function 90 (FIG. 5) is provided, within the microcomputer 74. The adjustment controller function 90 samples the signal 86A from the occupant sensor 84 to gather information regarding the occupant characteristic that is sensed by the occupant sensor. The information regarding the sensed occupant characteristic is processed by the adjustment controller function 90 to determine any needed adjustment of the restraint module 72. Once adjustment is determined, the adjustment signal 76A, which contains instructions for the restraint module 72 regarding the determined adjustment, is provided to the restraint module 72 and adjustment of the restraint module 8 is accomplished.

Within the system 70 (FIG. 4), a low G sensor 92 is provided as part of a means for controlling initiation of the adjustment process of the system. In the illustrated example of the second embodiment, the low G sensor 92 is identical to the low G sensor 40 of the first embodiment (FIG. 1). The low G sensor 92 (FIG. 4) provides its output signal 94, which is indicative of sensed acceleration, to the microcomputer 74. Also within the system 70, a vehicle speed sensor 96 is provided as part of the means for controlling initiation of the adjustment process of the system. Specifically, the vehicle speed sensor 96 is a sensor for sensing the traveling speed of the vehicle. The vehicle speed sensor 96 has any suitable structure for sensing vehicle speed. For example, the vehicle speed sensor 96 may monitor an output of a transmission of the vehicle, the rotation of a round engaging wheel, etc. The vehicle speed sensor 96 provides a signal 98 indicative of sensed vehicle speed to the microcomputer 74.

Within the microcomputer 74 (FIG. 5), a threshold determination function 100 continuously samples the signal 94 from the low G sensor 92, at a predetermined rate, and determines whether the signal 94 has a deceleration value that exceeds a predetermined threshold value. The predetermined deceleration threshold value is relatively low. In the preferred embodiment, the threshold value is approximately two G's (e.g., 64 ft/s$^2$ or 19.6 m/s$^2$). When the threshold determination function 100 determines that the signal 94 from the low G sensor 92 indicates a vehicle deceleration exceeding the predetermined threshold value, a digital HIGH signal 102 is provided. Otherwise, signal 102 is a digital LOW value. Also, within the microcomputer 74, a speed change calculation function 104 continuously samples the signal 98 from the vehicle speed sensor 96, at a predetermined rate, and calculates a vehicle speed change over the associated time. A signal 106 indicative of the calculated speed change is provided by the calculation function 104 to a threshold determination function 108.

The threshold determination function 108 determines whether the calculated vehicle speed change exceeds a predetermined threshold value (e.g., 64 ft/s$^2$). The amount of deceleration which results in the calculated speed change exceeding the speed change threshold value need not be the same amount of deceleration which results in the threshold determination function 100 determining that the signal 94 from the low G sensor 92 exceeds its threshold value. In other words, the threshold values in functions 100 and 108 need not be related. However, preferably, the threshold value used by function 108 is relatively low and is similar to the threshold value used by function 100. When the threshold determination function 108 determines that the signal 98 is indicative of deceleration exceeding the threshold value (i.e., a calculated speed change exceeding the threshold value), a digital HIGH signal 110 is provided. Otherwise, signal 110 is a digital LOW value.

The signals 102 and 110 are provided as inputs of an OR gate 112. When one or both of the signals 102, 110 are HIGH (i.e., indicative of a threshold value of vehicle deceleration), the OR gate 112 provides a digital HIGH signal 114 to the adjustment controller function 90. Otherwise, the output 114 is LOW. The HIGH signal 114 causes the adjustment controller function 90 to start the adjustment process, which results in adjustment of the adjustable aspects of the restraint module 72. Specifically, upon receiving the HIGH signal 114, the adjustment controller function 90 provides the signal 86B to the occupant sensor 84. The signal 86B includes an instruction for the occupant sensor 84 to begin its operation (i.e., transmission and reception of the ultrasonic signals) to "sense" the particular occupant characteristic (e.g., position or distance relative to the restraint 72). Once the occupant sensor 84 begins sensing, it provides the signal 86A (i.e., indicative of the occupant characteristic) to the microcomputer 74.

Also, after receipt of the HIGH signal 114 from the OR gate 112 and upon receipt of the signal 86A from the occupant sensor 84, the adjustment controller function 90 begins sampling the signal 86A to derive information on the sensed occupant characteristic. The adjustment controller function 90 processes the information from signal 86A to make one or more determinations regarding adjustment of the adjustable aspect of the restraint module 72, and provides the adjustment signal 76A to the restraint module to effect any needed adjustment.

Figure 6:
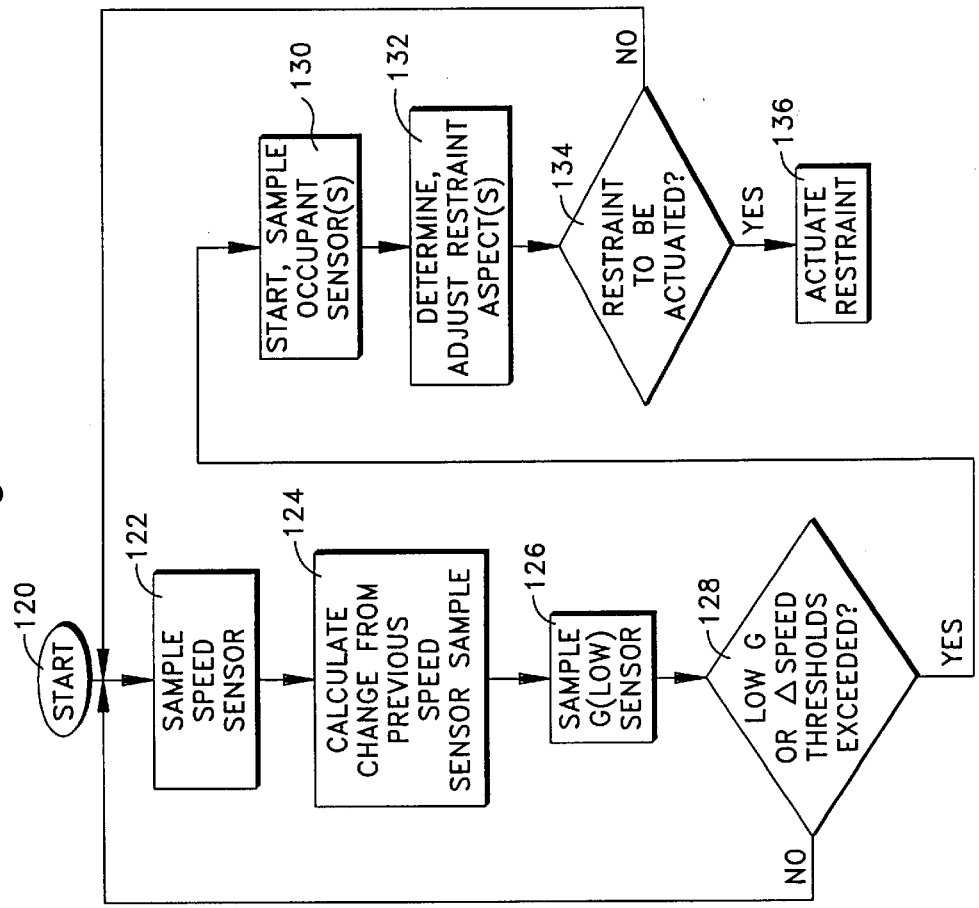
FIG. 6 is a flowchart for a process, in accordance with the present invention, performed within the microcomputer of the system shown in FIG. 5.

FIG. 6 illustrates a process that occurs within the microcomputer 74. The process of FIG. 6 is initiated at step 120 and proceeds to step 122 where the signal 98 from the vehicle speed sensor is sampled. At step 124, the change in vehicle speed is calculated. At step 126, the signal 94 from the low G sensor 92 is sampled. At step 128, it is determined whether the speed change threshold is exceeded and/or the acceleration threshold is exceeded. If the determination at step 128 is negative, the process loops back to step 122. If the determination at step 128 is affirmative, the process proceeds to step 130.

In step 130, the sensing of the occupant characteristic is initiated by sampling the signal 86A. At step 132, determination(s) and adjustment(s) regarding the restraint module 72 occur in response to the sensed occupant characteristic. At step 134, it is determined whether the restraint module 72 is to be actuated (e.g., whether the signal 80 from the sensor 78 is indicative of a deployment collision). If the determination step 134 is negative, the process loops back to step 122. If the determination at step 134 is affirmative, the process proceeds to step 136 where the restraint module 72 is actuated.

From the above description of the invention, those skilled in the art will perceive improvements, changes and modifications. For example, the functions provided by the microcomputer could be provided by hardwired discrete circuitry. Also, other crash or collision sensor(s) could be used. Such improvements, changes and modifications within the skill of the art are intended to be covered by the appended claims.

Having described the invention, the following is claimed:

1. An occupant restraint system for a vehicle, said system comprising:

an actuatable vehicle occupant restraint device having an aspect adjustable for adjusting actuation of said restraint device in response to an adjustment signal;

parameter sensing means for sensing a vehicle operating parameter functionally related to vehicle crash acceleration and for providing a parameter signal indicative thereof;

determination means for determining whether said parameter signal exceeds a threshold value;

characteristic sensing means for sensing an occupant characteristic and for providing an occupant characteristic signal indicative thereof; and control means for initiating determination of needed adjustment of said adjustable aspect of said restraint device in response to the determination that said parameter signal exceeds the threshold value, for determining adjustment using said occupant characteristic signal, and for providing said adjustment signal indicative of the determined needed adjustment to effect the needed adjustment of said restraint device;

wherein said control means including means for sampling said characteristic signal responsive to the determination that said parameter signal exceeds the threshold value.

2. An occupant restraint system for a vehicle, said system comprising:

an actuatable vehicle occupant restraint device having an aspect adjustable for adjusting actuation of said restraint device in response to an adjustment signal;

parameter sensing means for sensing a vehicle operating parameter functionally related to vehicle crash acceleration and for providing a parameter signal indicative thereof;

determination means for determining whether said parameter signal exceeds a threshold value;

characteristic sensing means for sensing an occupant characteristic and for providing an occupant characteristic signal indicative thereof; and control means for initiating determination of needed adjustment of said adjustable aspect of said restraint device in response to the determination that said parameter signal exceeds the threshold value, for determining adjustment using said occupant characteristic signal, and for providing said adjustment signal indicative of the determined needed adjustment to effect the needed adjustment of said restraint device;

wherein said characteristic sensing means sensing the occupant characteristic and providing said characteristic signal responsive to the determination that said parameter signal exceeds the threshold value.

3. A system as set forth in claim 2, wherein said determination means includes means for determining whether said parameter signal is indicative of vehicle deceleration above a threshold value, and the determination of needed adjustment by said control means is responsive to the determination that said parameter signal is indicative of vehicle deceleration above the threshold value.

4. A system as set forth in claim 2, wherein the vehicle operating parameter is vehicle deceleration, said parameter sensing means includes means for sensing vehicle deceleration.

5. A system as set forth in claim 4, further including parameter sensing means for sensing another vehicle operating parameter functionally related to vehicle crash acceleration and for providing another parameter signal indicative thereof, and determination means for determining whether said another parameter signal exceeds an associated threshold value, and wherein the determination of needed adjustment by said control means is also responsive to the determination that said another parameter signal exceeds the associated threshold value.

6. A system as set forth in claim 5, wherein said another vehicle operating parameter is vehicle speed, said parameter sensing means for sensing another vehicle operating parameter senses vehicle speed, and said determination means for determining whether said another parameter signal is indicative of vehicle crash acceleration above another threshold value includes means for determining an amount of change of the vehicle speed.

7. A system as set forth in claim 2, wherein the vehicle operating parameter is vehicle speed, said parameter sensing means includes means for sensing vehicle speed, and said determination means includes means for determining an amount of change of the vehicle speed.

8. A system as set forth in claim 2, wherein said restraint device includes an inflatable restraint.

9. A system as set forth in claim 2, further including condition sensor means for sensing a condition for which the occupant is to be restrained and for providing a condition signal indicative thereof, and means for causing actuation of said restraint device in response to said condition signal.

10. A system as set forth in claim 9, wherein the condition for which the occupant is to be restrained is a vehicle collision.

11. An occupant restraint system for a vehicle, said system comprising:

an actuatable vehicle occupant restraint device having an aspect adjustable for adjusting actuation of said restraint device in response to an adjustment signal;

parameter sensing means for sensing a vehicle operating parameter functionally related to vehicle crash acceleration and for providing a parameter signal indicative thereof;

determination means for determining whether said parameter signal exceeds a threshold value;

characteristic sensing means for sensing an occupant characteristic in response to a determination that said parameter signal exceeds the threshold value and for providing an occupant characteristic signal indicative thereof; and control means for determining needed adjustment of said adjustable aspect of said restraint device in response to said occupant characteristic signal and for providing said adjustment signal indicative of the determined adjustment to effect adjustment of said restraint device.

12. A system as set forth in claim 11, wherein said control means includes means for sampling said characteristic signal responsive to the determination that said parameter signal exceeds the threshold value.

13. A system as set forth in claim 11, wherein said determination means includes means for determining whether said parameter signal is indicative of vehicle deceleration above a threshold value, and the sensing of the occupant characteristic by said characteristic sensing means is responsive to a determination that said parameter signal is indicative of vehicle deceleration above the threshold value.

14. A system as set forth in claim 11, wherein the vehicle operating parameter is vehicle deceleration and said parameter sensing means includes means for sensing vehicle deceleration.

15. A system as set forth in claim 14, further including parameter sensing means for sensing another vehicle operating parameter functionally related to vehicle crash acceleration and for providing another parameter signal indicative thereof, and determination means for determining whether said another parameter signal exceeds an associated threshold value, and wherein the determination of needed adjustment by said control means is also responsive to the determination that said another parameter signal exceeds the associated threshold value.

16. A system as set forth in claim 15, wherein said another vehicle operating parameter is vehicle speed, said parameter sensing means for sensing another vehicle operating parameter senses vehicle speed, and said determination means for determining whether said another parameter signal is indicative of vehicle crash acceleration above another threshold value includes means for determining an amount of change of the vehicle speed.

17. A system as set forth in claim 11, wherein the vehicle operating parameter is vehicle speed, said parameter sensing means includes means for sensing vehicle speed, and said determination means includes means for determining an amount of change of the vehicle speed.

18. A method for controlling an actuatable vehicle occupant restraint device having an aspect which is adjustable for adjusting actuation of the restraint device, said method comprising:

sensing a vehicle operating. parameter functionally related to crash acceleration;

providing a parameter signal indicative of the sensed vehicle operating parameter;

determining whether the parameter signal exceeds a threshold value;

sensing an occupant characteristic;

providing an occupant characteristic signal indicative of the sensed occupant characteristic;

determining needed adjustment of the adjustable aspect of the restraint device in response to a determination that the parameter signal exceeds the threshold value and in response to the occupant characteristic signal; and adjusting the adjustable aspect of the restraint device in response to the determined needed adjustment;

wherein said step of sensing an occupant characteristic is in response to the determination that the parameter signal exceeds the threshold value.

19. A method as set forth in claim 18, wherein said step of determining whether the parameter signal exceeds a threshold value includes determining whether the parameter signal is indicative of vehicle deceleration above a threshold value, and the determination of adjustment is responsive to a determination that the parameter signal is indicative of vehicle deceleration above the threshold value.

20. A method as set forth in claim 18, wherein the vehicle operating parameter is vehicle deceleration.

21. A method as set forth in claim 20, further including: sensing another vehicle operating parameter functionally related to crash acceleration, providing another parameter signal indicative of the other sensed vehicle operating parameter, determining whether the other parameter signal exceeds an associated threshold value, and wherein the determination of needed adjustment is also in response to the determination that the another parameter signal exceeds the associated threshold value.

22. A method as set forth in claim 18, wherein the vehicle operating parameter is vehicle speed, the step of determining whether the parameter signal exceeds a threshold value includes determining an amount of change of the vehicle speed.

23. A method for controlling an actuatable vehicle occupant restraint device having an aspect which is adjustable for adjusting actuation of the restraint device, said method comprising:

sensing a vehicle operating parameter functionally related to crash acceleration;

providing a parameter signal indicative of the sensed vehicle operating parameter;

determining whether the parameter signal exceeds a threshold value;

sensing an occupant characteristic in response to a determination that the parameter signal exceeds the threshold value;

providing an occupant characteristic signal indicative of the sensed occupant characteristic;

determining needed adjustment of the adjustable aspect of the restraint device in response to the occupant characteristic signal; and adjusting the adjustable aspect of the restraint device in response to the determined needed adjustment.

24. A method as set forth in claim 23, wherein said step of determining whether the parameter signal exceeds a threshold value includes determining whether the parameter signal is indicative of vehicle deceleration above a threshold value, and the determination of adjustment is responsive to a determination that the parameter signal is indicative of vehicle deceleration above the threshold value.

25. A method as set forth in claim 23, wherein the vehicle operating parameter is vehicle deceleration.

26. A method as set forth in claim 25, further including: sensing another vehicle operating parameter functionally related to crash acceleration, providing another parameter signal indicative of the other sensed vehicle operating parameter, determining whether the other parameter signal exceeds an associated threshold value, and wherein the determination of needed adjustment is also in response to the determination that the another parameter signal exceeds the associate threshold value.

27. A method as set forth in claim 23, wherein the vehicle operating parameter is vehicle speed, the step of determining whether the parameter signal exceeds a threshold value includes determining an amount of change of the vehicle speed.

* * * * *